D. C. LOCKWOOD.
Strip for Coating Articles with Celluloid and other Plastic Compositions.
No. 205,880.  Patented July 9, 1878.
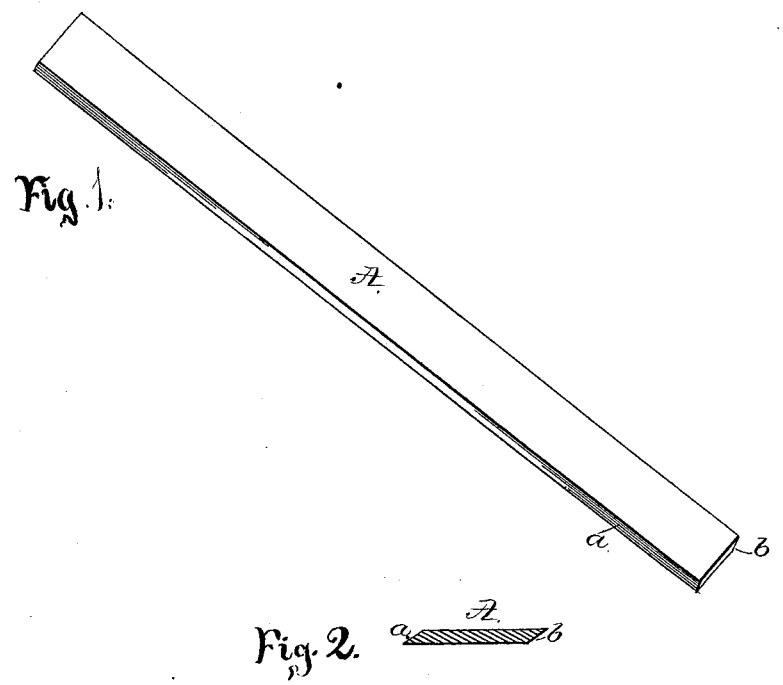
Fig. 1.
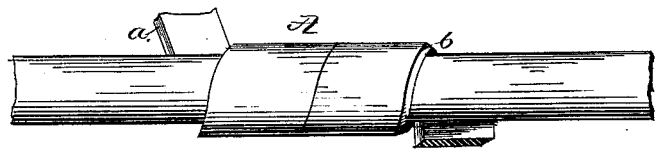
Fig. 2.
Fig 3.
Witnesses;
F. Walter Fowler,
Chas. O. Gill
Inventor;
David C. Lockwood
By his Attys,
Cox and Cox

UNITED STATES PATENT OFFICE.

DAVID C. LOCKWOOD, OF NEWARK, N. J., ASSIGNOR TO THE RUBBER AND CELLULOID HARNESS TRIMMING COMPANY, OF SAME PLACE.

IMPROVEMENT IN STRIPS FOR COATING ARTICLES WITH CELLULOID AND OTHER PLASTIC COMPOSITIONS.

Specification forming part of Letters Patent No. 205,880, dated July 9, 1878; application filed December 19, 1877.

*To all whom it may concern:*

Be it known that I, DAVID C. LOCKWOOD, of Newark, in the county of Essex and State of New Jersey, have invented a new and useful Improvement in Strips for Composition Coating, of which the following is a specification, reference being had to the accompanying drawings.

The invention relates to an improved strip for covering articles with plastic composition in such manner as to form a smooth homogeneous coating.

Usually all plastic compositions shrink or drag somewhat in the process of drying, and thus, if a core be covered with successive bands or spiral bands of material having a straight edge, the result will be that when the covering is dried the edges of each successive band or spiral will be found separated and the core exposed between.

To remedy this defect is the purpose of the present invention, which is effected by beveling the edges of the strip and overlapping them as the strip is wound upon the core in a spiral form. Thus as the material shrinks the overlapping edges are drawn down upon those below, and an even shrinkage takes place without any separations.

Referring to the accompanying drawings, Figure 1 is a perspective view of a strip of the material. Fig. 2 is a cross-section of same, and Fig. 3 is a plan view of the strip wound upon a core.

In the accompanying drawing, A represents a strip of plastic composition having the beveled edges *a b*.

Now, it is obvious that if the strip A be wound on a core, one of these edges will overlap the other, as shown at Fig. 3, and thus form a smooth-surfaced covering, which, when dried, will shrink evenly throughout, and the upper overlapping edge bind the lower overlapping edge, all separations being thus avoided. These edges may be united in any suitable manner, either by vulcanization, cement, or such solvents as soften the material and enable the homogeneous blending of the edges.

To produce the strip, it may be beveled by any known cutting device, or when plastic rolled into shape, or the nozzle of the stuffing-box wherein it is formed may be suitably shaped to give the strip beveled edges. The preferred article for the strip is the composition known as celluloid.

What I claim as my invention, and desire to secure by Letters Patent, is—

1. A strip of plastic composition beveled on its edges, substantially as set forth.

2. A core covered with a strip of plastic composition beveled on both edges, substantially as specified.

In testimony that I claim the foregoing improvement in strips for composition coating, as above described, I have hereunto set my hand this 13th day of December, 1877.

DAVID C. LOCKWOOD.

Witnesses:
REUNE J. D. DUNN,
HARRY COX.